(12) United States Patent
Gayden

(10) Patent No.: US 11,996,540 B2
(45) Date of Patent: May 28, 2024

(54) METHOD AND APPARATUS FOR MAKING LITHIUM ION BATTERY ELECTRODES

(71) Applicant: Intecells, Inc., Southfield, MI (US)

(72) Inventor: Xiaohong Gayden, West Bloomfield, MI (US)

(73) Assignee: INTECELLS, INC., Southfield, MI (US)

( * ) Notice: Subject to any disclaimer, the term of this patent is extended or adjusted under 35 U.S.C. 154(b) by 51 days.

(21) Appl. No.: 17/124,350

(22) Filed: Dec. 16, 2020

(65) Prior Publication Data

US 2021/0193986 A1    Jun. 24, 2021

Related U.S. Application Data

(60) Provisional application No. 62/951,398, filed on Dec. 20, 2019.

(51) Int. Cl.
H01M 4/04 (2006.01)
H01M 10/0525 (2010.01)

(52) U.S. Cl.
CPC ....... *H01M 4/0435* (2013.01); *H01M 4/0404* (2013.01); *H01M 4/0419* (2013.01); *H01M 10/0525* (2013.01)

(58) Field of Classification Search
CPC ............. H01M 4/0435; H01M 4/0404; H01M 4/0419; H01M 10/0525; H01M 4/0402;
(Continued)

(56) References Cited

U.S. PATENT DOCUMENTS

2003/0215710 A1* 11/2003 Lavoie ................ B32B 37/1054
264/105
2011/0104568 A1    5/2011 Sung et al.
(Continued)

FOREIGN PATENT DOCUMENTS

| CN | 108269957 | 7/2018 |
| DE | 102013103504 | 10/2014 |

(Continued)

OTHER PUBLICATIONS

Hideharu et al, JP2004-58436, English translation included, published Feb. 26, 2004 (Year: 2004).*

(Continued)

*Primary Examiner* — Charles Capozzi
(74) *Attorney, Agent, or Firm* — Honigman LLP; Andrew N. Weber; Jonathan P. O'Brien

(57) ABSTRACT

Disclosed is a method and apparatus for making a lithium-ion electrochemical cell component by advancing a substrate for a lithium ion cell between opposing first and second calendering rolls, depositing by atmospheric plasma deposition particles of electrode material comprising an active electrode material and a metal into a gap between a first side of the substrate and the first calendering roll, wherein the metal is surface-activated by the atmospheric plasma; and pressing the deposited particles of the active electrode material and the metal particles between the first and second calendering rolls into an electrode layer on the first side of the substrate. The apparatus includes a pair of opposing calendering rolls, a path for advancing the substrate between the calendering rolls, and at least one atmospheric plasma deposition device connected to a supply of the particles of the electrode material positioned to deposit particles of the electrode material into the gap between the substrate and one of the pair of opposing calendering rolls.

8 Claims, 5 Drawing Sheets

(58) Field of Classification Search
CPC ........ H01M 4/13; H01M 4/139; H01M 4/626; H01M 10/0404; H01M 10/058; H01M 4/0423; H01M 10/052; C23C 14/325; C23C 14/562; C23C 14/5886; Y02E 60/10; Y02P 70/50; B05D 5/12; B05D 3/12; B05D 7/50
USPC ...................................... 118/715, 723 R, 305
See application file for complete search history.

(56) References Cited

U.S. PATENT DOCUMENTS

| | | |
|---|---|---|
| 2012/0261391 A1 | 10/2012 | Ihde et al. |
| 2013/0143146 A1 | 6/2013 | Huang |
| 2014/0138802 A1 | 5/2014 | Starostine et al. |
| 2014/0342225 A1* | 11/2014 | Isshiki .................. H01M 4/366 429/217 |
| 2015/0162596 A1 | 6/2015 | Dadheech et al. |
| 2015/0280219 A1 | 10/2015 | Xiao et al. |
| 2015/0349307 A1 | 12/2015 | Dadheech |
| 2016/0056455 A1 | 2/2016 | Shibusawa |
| 2016/0254533 A1 | 9/2016 | Gayden |
| 2017/0058389 A1 | 3/2017 | Gayden et al. |
| 2017/0121807 A1 | 5/2017 | Deng et al. |
| 2017/0237074 A1 | 8/2017 | Lopatin et al. |
| 2017/0301958 A1 | 10/2017 | Deng et al. |
| 2017/0309888 A1 | 10/2017 | Yu et al. |
| 2018/0019457 A1 | 1/2018 | Alharizah et al. |
| 2018/0212271 A1 | 7/2018 | Lu et al. |
| 2018/0277849 A1 | 9/2018 | Gayden |
| 2020/0020925 A1 | 1/2020 | Aya |

FOREIGN PATENT DOCUMENTS

| | | |
|---|---|---|
| DE | 112014006664 | 1/2017 |
| EP | 2806493 | 11/2014 |
| EP | 2328214 | 8/2017 |
| JP | 2006-339184 | 12/2006 |
| JP | 2015-146247 | 8/2015 |
| JP | 2018-125240 | 8/2018 |
| JP | 2020-512677 | 4/2020 |
| KR | 10-2014-0146471 | 12/2014 |
| KR | 10-2018-0042641 | 4/2018 |
| WO | 2003/075375 | 9/2003 |
| WO | 2007028798 | 3/2007 |
| WO | 2010081610 | 7/2010 |
| WO | 2011005807 | 1/2011 |
| WO | 2011/019988 | 2/2011 |
| WO | 2014/116522 | 7/2014 |
| WO | 2014179355 | 11/2014 |
| WO | 2015172278 | 11/2015 |
| WO | 2016082120 | 2/2016 |
| WO | 2018182977 | 10/2018 |

OTHER PUBLICATIONS

Buske, WO2011107510, English translation included, published Sep. 9, 2011 (Year: 2011).*

Schaefer, WO2012/013286, English translation included, published Feb. 2, 2012 (Year: 2012).*

Toshiyuki et al, JP4897742, English translation included, published Mar. 14, 2012 (Year: 2012).*

Koc et al, WO2018/124992, in English, published Jul. 5, 2018 (Year: 2018).*

* cited by examiner

METHOD AND APPARATUS FOR MAKING LITHIUM ION BATTERY ELECTRODES

CROSS REFERENCE TO RELATED APPLICATIONS

This application claims the benefit of U.S. Provisional Patent Application No. 62/951,398, filed Dec. 20, 2019, which is hereby incorporated by reference in its entirety.

TECHNICAL FIELD

This specification relates to methods and equipment for making electrodes and electrode assemblies of lithium-ion cells.

INTRODUCTION

This section provides information helpful in understanding the invention but that is not necessarily prior art.

Assemblies of lithium-ion battery cells are used in many applications, from rechargeable batteries for laptops and other personal devices to use in providing motive power in automotive vehicles. Each lithium-ion cell of a battery may provide an electrical potential of about three to four volts and a direct electrical current, depending on the composition and mass of the electrode materials in the cell. Lithium-ion battery cells can be discharged and re-charged over many cycles. A battery may be assembled by combining a suitable number of individual cells in a combination of electrical parallel and series connections to satisfy voltage and current requirements for an electric device or motor. For example, the assembled battery for an automotive vehicle may have perhaps three hundred individually packaged cells that are electrically interconnected to provide forty to four hundred volts and sufficient electrical power to an electrical traction motor to drive a vehicle.

Each lithium-ion cell typically comprises a negative electrode layer (anode, during cell discharge), a positive electrode layer (cathode, during cell discharge), a thin, porous separator layer interposed in face-to-face contact between parallel, facing, electrode layers, a liquid, lithium-containing, electrolyte solution filling the pores of the separator and contacting the facing surfaces of the electrode layers for transport of lithium ions during repeated cell discharging and re-charging cycles, and a thin layer of a metallic current collector. It is desirable to have a manufacturing process that does not waste the expensive materials used in making the lithium ion components. Because a battery requires such a great number of lithium-ion cells to provide sufficient electrical power to an electrical traction motor to drive a vehicle, an efficient, high quality production method is a key commercial consideration for this end use.

Present production methods have several drawbacks. For example, electrodes are made by spreading or spraying a liquid slurry composition containing electrode material, conductive carbon materials, and a polymeric binder in a solvent system onto one or both sides of a thin metal foil, which serves as the current collector for the electrode. Thus, the electrodes have been made by dispersing mixtures of binders and active particulate materials in a suitable liquid and depositing the wet mixture as a coating layer of controlled thickness on the surface of a current collector metal foil. The deposited slurry layer must then be dried, e.g. in an oven, to force off the solvent, then pressed between calendering rollers to fix the resin-bonded electrode particles to their respective current collector surfaces. The electrodes formed on conductive metal current collector foil sheets of a suitable area and shape may then be cut (if necessary), folded, rolled, or otherwise shaped for assembly into lithium-ion cell containers with suitable porous separators and a liquid electrolyte.

This current process requires a large manufacturing footprint for producing the liquid slurry mixture and for the separate coating, drying, calendering, and assembly stations, and it requires high capital investment for the equipment as well as high energy costs, particularly in the drying step. Further, use of solvents may introduce health and fire hazards and produce regulated emissions.

Gayden, US Patent Application Publication 2016/0254533 describes manufacturing electrode members using an atmospheric plasma stream to heat the electrode material and deposit it on thin sheet substrates. The plasma stream containing the particles is directed on a substrate supported on a flat working surface. There is a significant loss of electrode material in this deposition arrangement due to overspray.

It would, therefore, be desirable to improve the process for manufacture of lithium-ion cells.

SUMMARY

This need is met by a method now disclosed of depositing particles of an active electrode material and a metal (referred to together as "electrode material") from an atmospheric plasma onto a lithium-ion cell substrate, e.g. a metal foil or separator film, as the substrate enters a gap between opposing calendering rolls. The active electrode material and the metal may be deposited as separate particles, whether from the same or from different atmospheric plasma deposition devices, or may be deposited as composite particles comprising particles of the metal and the active electrode material adhered together. The electrode material particles may be deposited from the atmospheric plasma directly into the gap or be directed onto the substrate in the gap. The metal particles (or metal portions of the composite particles) are surface-activated, surface-softened, and/or surface-melted (hereinafter referred to together as "surface-activated") by the atmospheric plasma such that the deposited electrode material is compressed between the calendering rolls into a coherent electrode layer adhering to the substrate. The calendering rolls need not be heated or may optionally be heated. The method may be used with cathode or anode materials deposited from the atmospheric plasma and may be used to make an electrode layer on a single side or on both sides of the substrate and/or sandwiched between substrates. The substrate may be sheetfed sheets or may be in the form of a continuous roll (also called a web).

One or more than one atmospheric plasma deposition device may be used to deposit the electrode material particles, depending on factors such as the size and deposition rate of the atmospheric plasma deposition device, the width of the substrate, and the desired electrode layer thickness and density. For example, for a thicker or denser electrode layer, a plurality of atmospheric plasma deposition devices may be positioned to deposit the electrode material particles in generally a same area of the gap as the substrate passes in between the calendering rolls such that more electrode material is deposited per unit area of substrate than could be deposited with fewer atmospheric plasma deposition devices. In another example, for a wider substrate a plurality of atmospheric plasma deposition devices may be positioned to deposit the electrode material particles in generally adjacent or overlapping areas width-wise across the substrate to prepare a generally uniform electrode layer across the width of the substrate. Electrode layer thickness and/or density may be controlled through setting the width of the gap into which the electrode material is deposited.

In an embodiment of the process, the lithium-ion cell substrate may be drawn through a gap between an opposing pair of calendering rolls with a first side against a first one of the calendering rolls, with deposition of electrode material from an atmospheric plasma deposition device into the gap between the second side of the substrate and the second calendering roll, the calendering rolls pressing the deposited electrode material into an electrode layer that adheres on the second side of the substrate. A second lithium-ion cell substrate may be concurrently drawn through the gap with a first side against the second calendering roll and a second side facing the first lithium-ion cell substrate, the atmospheric plasma deposition device depositing the electrode material between the two substrates, and the calendering rolls pressing the two substrates and deposited electrode material together to sandwich the electrode layer between the two lithium-ion cell substrates. Surface activation in the atmospheric plasma deposition of the metal particles of the electrode material or metal regions of composite electrode material particles causes the surface activated metal to adhere to other particles and to the substrates. For example, the lithium-ion cell substrate drawn through the gap with a first side against a first one of the opposing pair of calendering rolls may be a metal foil and the second lithium-ion cell substrate drawn through the gap with a first side against a second one of the opposing pair of calendering rolls may be a separator sheet, or vice versa. After leaving the calendering rolls, the electrode layer-substrate assembly, optionally with the second substrate on the opposite side of the electrode layer, may be cut into a shape to be assembled into lithium ion cells, e.g. slit into strips that may be further cut such as with a laser into individual lithium ion cell assemblies, or collected, e.g., by rolling the electrode layer-substrate assembly up on an uptake roller, for later fabrication into lithium ion cells.

In another embodiment of the process, an electrode layer may be built up by passing through successive pairs of calendering rolls, each succeeding pair of calendering rolls being separated by a greater gap width between the rolls than the previous pair of calendering rolls, so that an additional amount of electrode material may be deposited by atmospheric plasma deposition into the gap between the rolls and pressed onto the existing electrode layer by the rolls to make a thicker electrode layer. In this embodiment, the lithium-ion cell substrate may be drawn through a gap of a first width with a first side against a first one of a first opposing pair of calendering rolls, with deposition of electrode material from an atmospheric plasma deposition device into the gap of the first width between the second side of the substrate and the second calendering roll, the calendering rolls pressing the deposited electrode material into an electrode layer of a first thickness adhered on the second side of the substrate. The substrate is then drawn through a second, wider gap having a second width greater than the first width, with a first side against a first one of a second opposing pair of calendering rolls, with deposition of electrode material from a second atmospheric plasma deposition device into the second gap between the electrode layer already on the substrate and the second calendering roll of the second pair of calendering rolls, the second pair of calendering rolls pressing the electrode material deposited from the second plasma deposition device to form an electrode layer of a second thickness greater than the first thickness on the second side of the substrate. The substrate may pass through further pairs calendering rolls set progressively further apart, with additional electrode material being deposited by atmospheric plasma deposition into a gap between the calendering rolls and onto the electrode layer so as to continue to build up the thickness of the electrode layer on the first substrate until a desired final electrode layer thickness is reached between a final pair of calendering rolls. Optionally, a second lithium-ion cell substrate may be concurrently drawn through the gap between the final pair of calendering rolls with a first side of the second substrate against a calendering roll and a second side facing the electrode layer on the first lithium-ion cell substrate, an atmospheric plasma deposition device depositing the final amount of electrode material, and the calendering rolls pressing the two substrates and deposited electrode material together to sandwich the electrode layer of the final desired thickness between the two lithium-ion cell substrates, which may be (as described above) a metal foil and a separator sheet. In a further method, after the electrode layer of the final desired thickness is formed on the first substrate, the assembly of electrode layer-first substrate may be drawn between a pair of calendering rolls with the electrode layer facing a gap between the rolls, and metal particles may be deposited from an atmospheric plasma into the gap and calendered between the rolls to form a metal current collector layer on the electrode layer. The electrode layer-substrate assembly, optionally with the second substrate or plasma-deposited current collector layer on the opposite side of the electrode layer or current collector layer, may (as described above) be cut into a final shape to be assembled into lithium ion cells or collected, e.g., by rolling the electrode layer-substrate assembly up on an uptake roller, for later further fabrication steps.

In another embodiment, a lithium ion cell substrate may be drawn through the gap with a first layer of a first electrode material applied by atmospheric plasma deposition to a first side of the substrate and a second layer of a second electrode material applied by atmospheric plasma deposition to a second side of the substrate; wherein, passing between the opposing calendering rolls, the first layer is pressed between a first calendering roll and the first side into a first electrode layer and the second layer is pressed between a second calendering roll and the second side into a second electrode layer. The first electrode material may be the same as the second electrode material or the first electrode material may have a different active electrode material and/or metal than the second electrode material. In an embodiment, the first electrode material is an anode material, the second electrode material is a cathode material, and the substrate is a porous separator sheet. In this embodiment, there may be a partition between the cathode material and anode material sides to prevent cross-contamination. Also in this embodiment, a first metal foil may be drawn through the gap against a first one of the calendering rolls and a second metal foil may be drawn through the gap against a second one of the calendering rolls to be pressed into an assembly of metal foil-anode layer-porous separator-cathode layer-metal foil. In another embodiment, the first electrode material and the second electrode materials are either both anode materials or are both cathode materials, and the substrate is a metal foil (e.g., current collector for the lithium ion cell). In a further method, the first electrode layer is an anode layer, the second electrode layer is a cathode layer, and the anode layer-substrate-cathode layer assembly may be drawn between a second pair of calendering rolls with one or both of the electrode layers facing a gap between the rolls, and metal particles may be deposited from an atmospheric plasma into the gap and calendered between the rolls to form a metal current collector layer on the one or both electrode layers. After leaving the calendering rolls, the product lithium ion cell assembly may be cut into a final shape to be assembled into lithium ion cells and batteries, e.g. slit into strips that may be further cut such as with a laser into individual lithium ion cell assemblies, or collected, e.g., by rolling the electrode layers-substrate(s) assembly up on an uptake roller, for later further fabrication steps.

In another embodiment of the process in which a lithium ion cell substrate is drawn through the gap with a first layer of a first electrode material applied by atmospheric plasma deposition to a first side of the substrate and a second layer of a second electrode material applied by atmospheric plasma deposition to a second side of the substrate, the electrode layer on the first side or on the second side or on both sides may be built up by passing through successive pairs of calendering rolls, each succeeding pair of calendering rolls having a greater gap width between the substrate and the calendering roll on the substrate side of the electrode layer being built up than that provided by the previous pair of calendering rolls so that an additional amount of electrode material may be deposited by atmospheric plasma deposition into the gap between the substrate and the calendering roll and pressed by the calendering rolls to make a thicker electrode layer. In this embodiment, the lithium-ion cell substrate may be drawn through a gap between a first opposing pair of calendering rolls, with deposition of electrode material from an atmospheric plasma deposition device into a gap of a first width between one side of the substrate and a first calendering roll and deposition of electrode material from an atmospheric plasma deposition device into a gap of a second width between the second side of the substrate and a second calendering roll, the calendering rolls pressing the deposited electrode materials into an electrode layer of a first thickness adhered on the first side and an electrode layer of a second thickness adhered on the second side of the substrate. The first width and the second width may be the same or different, and first thickness and the second thickness may be the same or different. The substrate is then drawn through a second, wider gap between a second opposing pair of calendering rolls, in which there is a further gap between electrode layer and calendering roll on one side or on both sides of the substrate to allow deposition of more electrode material from an additional atmospheric plasma deposition device into the gap between the electrode layer already on the substrate and a calendering roll of the second pair of calendering rolls, the second pair of calendering rolls pressing the electrode material deposited to form an electrode layer of a greater thickness on the substrate on the one side or on both sides of the substrate. The substrate may pass through further pairs calendering rolls set progressively further apart, with additional electrode material being deposited by atmospheric plasma deposition into a gap between a calendering roll of each further pair and the electrode layer on one or both sides of the substrate so as to continue to build up the thickness of the electrode layer or to build up the thickness of both electrode layers until a desired final electrode layer thickness is reached between a final pair of calendering rolls. A second lithium-ion cell substrate may be concurrently drawn through a gap between a first one of the final pair of calendering rolls and a first electrode layer with a first side of the second substrate against a calendering roll and a second side facing the electrode layer already on the first lithium-ion cell substrate, an atmospheric plasma deposition device depositing the final amount of electrode material between the second substrate and the electrode layer on the first substrate; optionally a third substrate being concurrently drawn through a gap between a second one of the final pair of calendering rolls and a second electrode layer with a first side of the third substrate against the second calendering roll and a second side facing the second electrode layer already on the first lithium-ion cell substrate, an atmospheric plasma deposition device depositing the final amount of electrode material between the third substrate and the second electrode layer on the first substrate; and the calendering rolls pressing the substrates and deposited electrode material together to sandwich the electrode layer(s) of the final desired thickness between the two lithium-ion cell substrates. For example, the first substrate may be a porous separator layer on which an anode layer is built up on one side and a cathode layer is built up on the other side, and the second and third substrates may be metal foils. In another example, the first substrate may be a metal foil on which anode layers are built up on both sides or cathode layers are built up on both sides, and the second and optionally a third substrate is a porous separator sheet. In a further variation of the process, when the first substrate is a porous separator layer on which an electrode layer is built up on one side and a cathode layer is built up on the other side, this assembly may be drawn through a gap between a further pair of calendering rolls and metal particles may be deposited from an atmospheric plasma on one or both electrode layers and calendered between the rolls to form a current collector layer on the electrode layer or on both electrode layers. The electrode layers-substrate(s) assembly may (as described above) be cut into a final shape to be assembled into lithium ion cells or collected, e.g., by rolling the electrode layer-substrate assembly up on an uptake roller, for later further fabrication steps.

Also disclosed is an apparatus having a path for advancing a lithium ion cell substrate between at least one pair of opposing calendering rolls, which may optionally be heated. At least one atmospheric plasma deposition device is positioned to deposit by atmospheric plasma deposition particles of electrode material comprising an active electrode material and a metal, supplied from a reservoir or reservoirs of the particles connected to the plasma deposition device, into a gap between a first side of the substrate and one of the pair of calendering rolls. The pair of calendering rolls serve to press the deposited particles into an electrode layer on the first side of the substrate. The path may include an unwinding roll for the substrate and an uptake roll for the product substrate with an electrode layer on the first side. Instead of the uptake roll, the apparatus may include a cutting table for slitting and/or cutting the product substrate with the electrode layer into a desired shape for assembly into a lithium ion cell. The apparatus may include a plurality of atmospheric plasma deposition devices arranged along the width of the substrate, each positioned to deposit particles of electrode material from a connected reservoir or connected reservoirs. The active electrode material and a metal may be co-deposited from the plasma deposition devices (as separate particles of metal and particles of active electrode material or as composite particles containing both active electrode material and metal) or separately from different plasma deposition devices, preferably generally uniformly and in a desired volume proportion of metal to active electrode material into the gap across a desired part of the width of the substrate with the calendering rolls being of a length suitable to press deposited electrode layer into an electrode layer on the substrate. In one embodiment, the path advances the substrate, which may be a metal foil or a porous separator sheet, against a first calendering roll of the pair, and the apparatus may further include a path for advancing a second substrate, which may be the other of a metal foil or a porous separator sheet, against a second calendering roll of the pair so that the electrode layer is formed between the first substrate and the second substrate. In another embodiment, the path advances the substrate through one or more pairs of calendering rolls, each succeeding pair of calendering rolls having a greater gap width than the immediately preceding pair of calendering rolls, wherein one or more further atmospheric plasma deposition devices is or are positioned to deposit by atmospheric plasma deposition particles of electrode material comprising an active electrode material and a metal, supplied from a reservoir or reservoirs of the particles connected to the plasma device, into the gap between the electrode layer and one of the pair of calendering rolls, such that the thickness of the electrode layer is increased as the substrate passes through each succeeding pair of calendering rolls. Both in the embodiment having one pair of calendering rolls equipped with at least one plasma deposition device to deposit electrode material and in the embodiment having a plurality of pairs of calendering rolls equipped with plasma deposition devices to deposit electrode material, the disclosed apparatus may include a final pair of calendering rolls equipped with plasma deposition device(s) to deposit electrode material and a path for advancing a second lithium ion cell substrate between one of the final pair of calendering rolls and the electrode layer being formed between the final pair calendering rolls, and optionally equipped with plasma deposition device(s) to deposit electrode material and a path for advancing a third lithium ion cell substrate between the other roll of the final pair of calendering rolls and an electrode layer on the other side of the substrate being formed between the final pair calendering rolls. In other embodiments, the apparatus may include a final pair of calendering rolls equipped with at least one plasma deposition device to deposit metal particles from a supply of metal particles suitable to form a current collector layer on the electrode layer or, if the substrate has an electrode layer on both sides, at least one plasma deposition device to deposit metal particles from a supply into a gap between each electrode layer and one of the final pair of calendering rolls, the deposited metal particles being pressed by the final pair of calendering rolls into a current collector layer on the electrode layer.

Also disclosed is an apparatus having a path for advancing a lithium ion cell substrate between a plurality of pairs of calendering rolls, the rolls optionally capable of being heated, each pair of calendering rolls equipped with one or more atmospheric plasma deposition devices equipped to supply particles of electrode material comprising an active electrode material and a metal, from a reservoir or reservoirs of the particles connected to the plasma device, into a gap between a first side of the substrate and one of the pair of calendering rolls as previously described, in which each succeeding pair has a greater gap width as previously described, wherein, after an electrode layer of desired thickness is formed on one side of the substrate, the substrate path advances the substrate through the next pair of calendering rolls with the electrode layer against a first one of the calendering rolls and the one or more atmospheric plasma deposition devices positioned to deposit particles of electrode material into a gap between the substrate face opposite the electrode layer and a second one of the calendering rolls. The apparatus of this embodiment can apply an electrode layer to a first side of the substrate and then apply an electrode layer to the second side of the substrate. As previously described, the apparatus may optionally have a plurality of pairs of calendering rolls depositing electrode material on each side to build up the thickness of the electrode layer on each side; the apparatus may optionally have a path for providing a further substrate between the electrode layer being formed and the calendering roll facing the electrode layer being formed to sandwich the electrode layer being formed between lithium ion cell substrates or a pair of calendering rolls equipped with at least one plasma deposition device to deposit metal particles from a supply of metal particles suitable to form a current collector layer on the electrode layer. In these embodiments, the electrode material in the supply to the plasma deposition devices positioned on either side of lithium ion cell substrate may have the same composition or different compositions.

Also disclosed is an apparatus for advancing a lithium ion cell substrate between at least one pair of opposing calendering rolls in which at least one atmospheric plasma deposition device having a supply of particles of electrode material comprising an active electrode material and a metal is positioned to deposit the particles of electrode material by atmospheric plasma deposition into a gap between a first side of the substrate and the first calendering roll and at least one further atmospheric plasma deposition device having a supply of particles of electrode material comprising an active electrode material and a metal is positioned to deposit the particles of electrode material by atmospheric plasma deposition into a second gap between a second side of the substrate and the second calendering roll. The pair of calendering rolls serve to press the deposited particles into an electrode layer on the first side of the substrate and a second electrode layer on the second side of the substrate. The path may include an unwinding roll for the substrate and an uptake roll for the product substrate with the electrode layers on either side. Instead of the uptake roll, the apparatus may include a cutting table for slitting and/or cutting the product substrate with the electrode layers on either side into a desired shape for assembly into a lithium ion cell. The apparatus may include a plurality of atmospheric plasma deposition devices having a supply of particles of electrode material comprising an active electrode material and a metal is positioned to deposit the particles of electrode material, whether together from the same deposition devices or separately from different deposition devices, generally evenly into the gaps across a desired part of the width of the substrate such that the calendering rolls can press deposited electrode layer into an electrode layer or the substrate. When the substrate is a metal foil, the electrode material type (cathode or anode) can be the same on both sides of the metal foil (i.e., anode material supply for the plasma deposition devices on both sides or cathode material supply for the plasma deposition devices on both sides) and the apparatus may further include, on one or both sides of the metal foil, a path for providing a porous separator sheet between the electrode layer being formed and the calendering roll facing the electrode layer being formed to sandwich the electrode layer being formed between the metal foil and the separator sheet. When the substrate is a porous separator sheet, the electrode material type in supply (cathode or anode) can be different on the first and second sides of the porous separator sheet (i.e., a cathode layer on one side and an anode layer on the other side), and the apparatus may optionally further include a path for providing a metal foil between the electrode layer being formed and the calendering roll facing the electrode layer being formed to sandwich the electrode layer being formed between the metal foil and the separator sheet or, alternatively, the apparatus may optionally further include at least one further pair of opposing calendering rolls in which at least one further atmospheric plasma deposition device having a supply of metal particles suitable to form a current collector layer is positioned to deposit the metal particles by atmospheric plasma deposition into a third gap between a first side of the substrate and one of the pair of calendering roll and at least one further atmospheric plasma deposition device having a supply of metal particles suitable to form a current collector layer is positioned to deposit the metal particles by atmospheric plasma deposition into a fourth gap between a second side of the substrate and the other of the pair of calendering roll to form current collector layers on the electrode layers.

Also disclosed is an apparatus configured as in any of the embodiments described above in which the pair of opposing calendering rolls equipped with the atmospheric plasma deposition device(s) are configured with a guard or closure for the gap positioned near or at the ends of the calendering rolls to contain deposited electrode material and either prevent deposition of material on an outer edge of the substrate or prevent loss of electrode material from the ends of the calendering rolls. The guard or closure may be fixed into the gap between the calendering rolls or may be attached to or integral with one or both of the calendering rolls. In one such embodiment, at least one roll of the pair has a raised ring or ridge at or near one or both of its ends, which may be part of the roll or may be a separate article fit over the end of the roll such as a gasket which may comprise, for example, a rubber such as silicone rubber, that extends toward the second roll of the pair so as to close off or at least partially close off the gap between that roll and the substrate. The apparatus may further include a brush or scraping edge outside the gap (e.g., in an area away from the gap) to remove any accumulated electrode material from the raised ring, ridge, or gasket. In another such embodiment, a stationary guard or closure is fit into the gap between substrate and a calendering roll near or at an end of the calendering roll to contain deposited electrode material, optionally with a path for a second substrate between the stationary guard and the calendering roll.

The disclosed methods and equipment advantageously minimizes wasteful overspray of the active electrode material to efficiently and economically produce electrodes and combined electrodes for lithium ion batteries. Because the application of the electrode material to the substrate is a solid state coating method, the disclosed methods and equipment avoids using any solvent. As a further advantage, the disclosed methods and equipment provide high throughput of electrodes, assemblies of multiple electrodes, half-cell assemblies, and full-cell assemblies for economical production than previous methods that require separate coating and assembly steps and allow for easy control of thickness and density of the applied electrode material layer.

BRIEF DESCRIPTION OF THE DRAWINGS

The embodiments can be better understood with reference to the following drawings and description. The components in the figures are not necessarily to scale, emphasis instead being place upon illustrating the principles of the embodiments. The drawings for illustrative purposes only of selected aspects and not all possible implementations, and are not intended to limit the scope of the present disclosure.

DETAILED DESCRIPTION

Definitions

Figure 1:
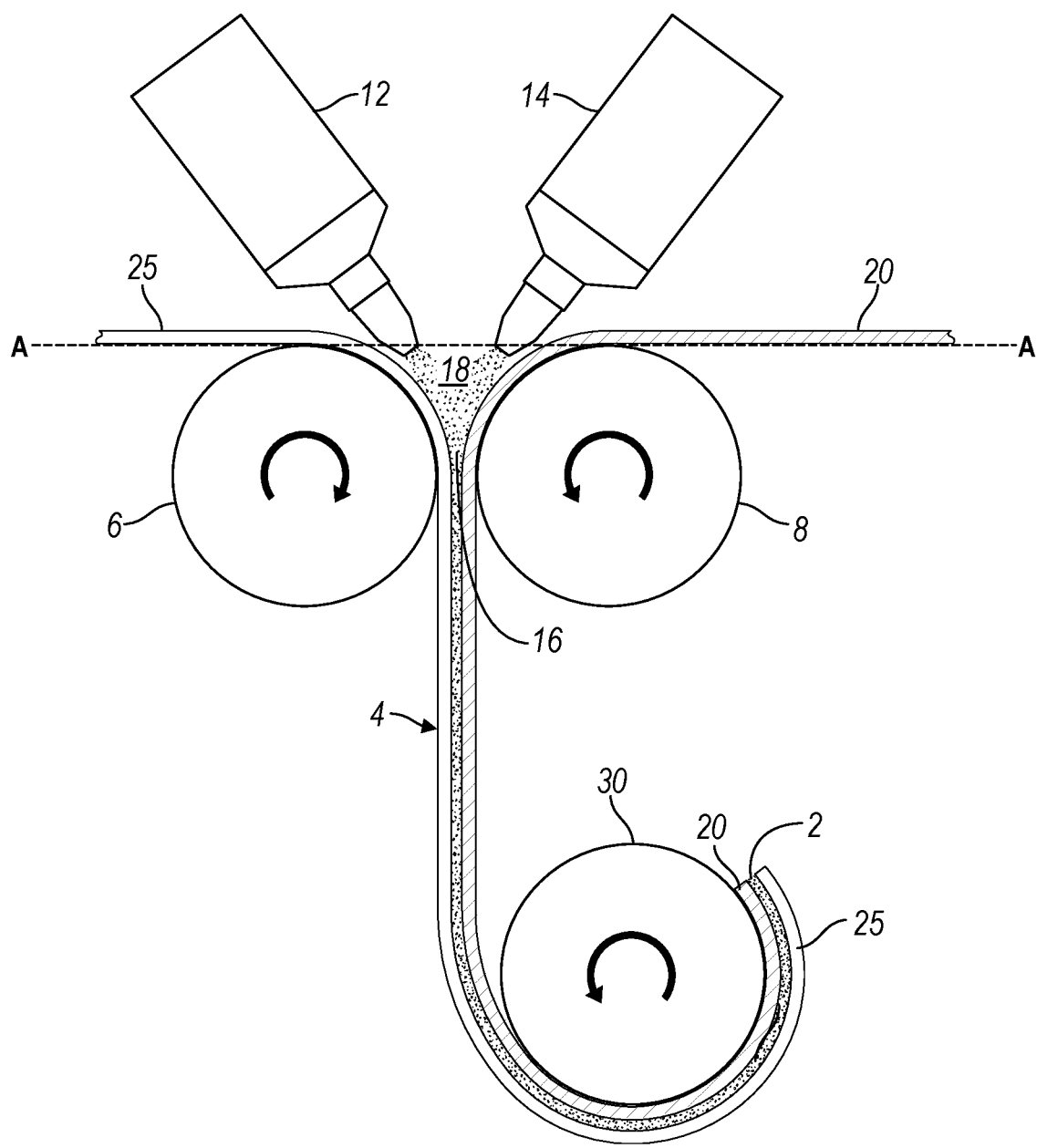
FIG. 1 is a schematic illustration of a first aspect of the invention.

"A," "an," "the," "at least one," and "one or more" are used interchangeably to indicate that at least one of the item is present; a plurality of such items may be present unless the context clearly indicates otherwise. All numerical values of parameters (e.g., of quantities or conditions) in this specification, including the appended claims, are to be understood as being modified in all instances by the term "about" whether or not "about" actually appears before the numerical value. "About" indicates that the stated numerical value allows some slight imprecision (with some approach to exactness in the value; approximately or reasonably close to the value; nearly). If the imprecision provided by "about" is not otherwise understood in the art with this ordinary meaning, then "about" as used herein indicates at least variations that may arise from ordinary methods of measuring and using such parameters. In addition, disclosure of ranges includes disclosure of all values and further divided ranges within the entire range.

"Active electrode material" means a lithium intercalation material that is in either an anode or a cathode during operation of a lithium ion cell or battery.

"Adhered" when used to describe attachment of metal particles surface-energy activated, surface-softened, or surface-melted (together, "surface-activated") in an atmospheric plasma to other metal particles, active electrode material particles, or a lithium-ion cell substrate means a surface attachment of the metal particles. The metal particles adhere as they return to their original state after the surface energy activation by the atmospheric plasma. The metal particles do not fully or substantially melt. The active electrode material particles do not undergo any change in the atmospheric plasma.

"Atmospheric plasma" refers to a plasma produced at a temperature up to about 3500° C. and at a pressure at or about at atmospheric pressure. In an atmospheric plasma, the peak temperature reached by the active electrode material particles are typically less than about 1200° C.

The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. As used in this specification, the term "or" includes any and all combinations of one or more of the associated listed items.

"Particle size" refers to average particle size as determined by the ISO 13320 test method.

Each of the disclosed methods includes depositing from an atmospheric plasma deposition device particles of a lithium-ion cell electrode material, which particles include an active electrode material and a metal, into a gap between an opposing pair of calendering rolls. At least one sheet of a lithium-ion cell substrate is drawn through the gap, and the calendering rolls press the deposited particles into an electrode layer on a side of the sheet of the lithium-ion cell substrate to make an electrode assembly for a lithium-ion cell. The metal is surface-activated in the atmospheric plasma, causing the electrode material to cohere and adhere to the substrate. The rate at which the particles are deposited from the atmospheric plasma deposition device or deposition devices and the width of the gap are selected to produce an electrode layer of the particles of a desired thickness and density in the electrode assembly.

A detailed description of exemplary, non-limiting embodiments, with reference to the figures, follows.

In FIG. 1, opposing calendering rolls 6, 8 define an interior gap 18. Calendering rolls 6, 8 are placed such that gap 18 will produce a desired thickness of electrode layer 2 between separator sheet 25 and metal foil 20 in the separator-electrode-metal foil assembly 4 exiting from calendering rolls 6, 8. In FIG. 1, separator sheet 25 is pulled over calendering roll 6, and metal foil 20 is pulled over calendering roll 8. The lengths of calendering rolls 6, 8 along their rotational axes and the widths of separator sheet 25 and metal foil 20 may be generally the same or about the same for efficient production of the separator-electrode-metal foil assembly and to forestall build-up of electrode material on calendering rolls 6, 8. There may be guards (not shown) against either end of calendering rolls 6, 8 that may extend upward to the top of or above gap 18 to prevent spillage of electrode material 16 (i.e., prevent electrode material 16 from spilling out from gap 18). In the example of FIG. 1, separator sheet 25 and metal foil 20 are shown as webs that may be drawn from unwind rolls (not shown), optionally drawn through a delivery pathway that includes tensioning rolls (not shown), with the product separator-electrode-metal foil assembly 4 being wound on uptake roller 30. The product separator-electrode-metal foil assembly 4 may instead be cut into individual electrode shapes rather than being wound on uptake roller 30.

Atmospheric plasma deposition device 12 and atmospheric plasma deposition device 14 deposit particulate electrode material 16 into the gap 18 via atmospheric plasma deposition. Electrode material 16 comprises a particulate electrode material comprising active electrode material and a metal surface-activated by the plasma. In one embodiment, particulate active electrode material and particulate metal surface-activated by the plasma are co-deposited from each atmospheric plasma deposition device, either as individual particles or as composite particles containing active electrode material and metal adhered together. The rate of deposition of the electrode material from each atmospheric plasma deposition device may be from about 0.5 gram to about 20 grams per minute, or may be from about 1 gram to about 15 grams per minute. A sufficient number of the atmospheric plasma deposition devices may be located along the length of the calendering rolls 6, 8 to deposit the electrode material 16 along a desired length of the open gap. Depending on the rate at which each atmospheric plasma deposition device deposits the electrode material 16, the rate at which the separator sheet 25 and metal foil 20 are moving through the gap 18, and the desired thickness of electrode layer 2 in the product separator-electrode-metal foil assembly 4, a plurality of atmospheric plasma deposition devices may be positioned to deposit the electrode material 16 in a given area or in overlapping areas to supply a desired amount of the electrode material 16 per unit volume into the gap between the separator sheet 25 and metal foil 20. A portion of the electrode material 16 may be deposited by the atmospheric plasma deposition onto one or both of the separator sheet 25 and metal foil 20 at a point before the gap 18, but at least a portion, preferably substantially all, and particularly preferably all of the electrode material 16 is deposited by the atmospheric plasma deposition into gap 18 or onto one or both of the separator sheet 25 and metal foil 20 at a point after the substrates enter the gap 18. The gap 18 begins at an imaginary plane A-A passing through the outermost circumference points of calendering rolls 6, 8. Thus, the plasma deposition device jet(s) may be located so that the opening emitting the particles is past plane A-A and into the gap 18.

In an alternative embodiment, particulate metal surface-activated by the plasma may be deposited by a first atmospheric plasma deposition device jet and particulate active electrode material may be deposited from a second atmospheric plasma deposition device jet into a same area of the gap 18.

The apparatus illustrated in FIG. 1 may be oriented vertically as shown, or may be oriented horizontally or at any angle between vertical and horizontal.

Atmospheric plasma generators and spray deposition devices are commercially available. The plasma deposition device typically has a metallic tubular housing which provides a flow path of suitable length for receiving the flow of a working gas carrying dispersed particles of the electrode material and for enabling the formation of the plasma stream in an electromagnetic field established within the flow path of the tubular housing. The tubular housing typically terminates in a conically tapered outlet shaped to direct the contained, particle-carrying plasma stream toward the substrate (e.g., separator sheet 25 or metal foil 20) to be coated. An electrically insulating ceramic tube is typically inserted at the inlet of the tubular housing such that it extends along a portion of the flow passage. A stream of a working gas, such as air, carrying the dispersed particles of electrode material is introduced into the inlet of the deposition device. The flow of the air-particle mixture may be caused to swirl turbulently in its flow path by use of a swirl piece with flow openings inserted near the inlet end of the deposition device. A linear (pin-like) electrode may be placed at the ceramic tube site along the flow axis of the deposition device at the upstream end of the tubular housing. During plasma generation the electrode is powered by a high frequency generator, for example at a frequency of about 50 to 60 kHz, and to a suitable potential such as a few kilovolts. The metallic housing of the plasma deposition device is grounded, and an electrical discharge can be generated between the axial pin electrode and the housing. When the generator voltage is applied, the frequency of the applied voltage and the dielectric properties of the ceramic tube produce a corona discharge at the stream inlet and the electrode. As a result of the corona discharge, an arc discharge from the electrode tip to the housing is formed. This arc discharge is carried by the turbulent flow of the air/particulate electrode material stream to the outlet of the deposition device. A reactive plasma of the air (or other carrier gas) and suspended particulate electrode material is formed at a relatively low temperature and at atmospheric pressure. The outlet of the plasma deposition device is shaped to direct the particle-carrying plasma stream into the gap between the calendering rolls.

The width of the separator sheet 25 and the metal foil 20 may be from about 1 mm to about 800 mm, preferably from about 5 mm to about 300 mm, and more preferably from about 30 mm to about 200 mm. The thickness of the separator sheet 25 may be from about 5 micrometers to about 30 micrometers, preferably from about 10 micrometers to about 25 micrometers, and more preferably from about 15 micrometers to about 20 micrometers. The thickness of the metal foil 20 may be from about 5 micrometers to about 25 micrometers, preferably from about 10 micrometers to about 20 micrometers, and more preferably from about 12 micrometers to about 15 micrometers. The thickness of the electrode layer 2 may be from about 5 micrometers to about 500 micrometers, preferably from about 30 micrometers to about 300 micrometers, and more preferably from about 60 micrometers to about 200 micrometers. The thickness of the separator-electrode-metal foil assembly 4 may be from about 15 micrometers to about 550 micrometers, preferably from about 60 micrometers to about 300 micrometers, and more preferably from about 85 micrometers to about 225 micrometers. The separator sheet 25 and the metal foil 20 may enter the gap 18 at a rate of from about 5 to about 150 meters per minute.

The particulate active electrode material may have particle sizes in the range from about 100 nanometers to about 100 micrometers. In an example embodiment the active electrode material may have a particle size in the range from about one micrometer to about fifty micrometers. The deposited electrode layer containing the active electrode material and the metal may typically from about 5 micrometers to about 500 micrometers thick. In an example embodiment the deposited electrode layer is from about 5 micrometers to about 350 micrometers thick.

Suitable examples of active anode materials include, without limitation, lithium titanate (LTO), graphite, and silicon-based materials such as silicon, silicon alloys, SiOx, and LiSi alloys. Suitable examples of active cathode materials include, without limitation, lithium manganese nickel cobalt oxide (NMC), lithium manganese oxide (LMO), lithium cobalt oxide (LCO), lithium nickel cobalt aluminum oxide (NCA), lithium iron phosphate (LFP), and other lithium-complementary metal(s) oxides and phosphates. More than one active anode material may be deposited from the atmospheric plasma deposition in making a deposited anode layer, and more than one active cathode material may be deposited from the atmospheric plasma deposition in making a deposited cathode layer. When more than one active electrode material is deposited, the different active electrode materials may be deposited from separate atmospheric plasma deposition devices or may be deposited from a same atmospheric plasma deposition device. If deposited from a same atmospheric plasma deposition device, the different active electrode materials may be introduced into the atmospheric plasma as a pre-made mixture or may be introduced into the atmospheric plasma from separate feed lines.

The plasma-deposited particulate electrode material also comprises a particulate metal that is surface-activated by the plasma, which serves to adhere the electrode layer to the substrate. In the case of particulate metal for the cathode layer, the metal particles may have a particle size less than the particle size of the active cathode material or up to about the same as the particle size of the active cathode material. For example, the metal particles deposited in making a cathode layer may have particle sizes in the range from about 1 nanometer to about 100 micrometers or from about 10 nanometers to about 50 micrometers or from about 100 nanometers to about 5 micrometers. In the case of particulate metal for the anode layer, the metal particles may have a particle size about the same as or greater than the particle size of the active anode material. For example, the metal particles deposited in making an anode layer may have particle sizes in the range of from about 100 nanometers to about 100 micrometers or from about 10 nanometers to about 50 micrometers or from about 100 nanometers to about 5 micrometers. In making an anode layer, the metal particles may comprise a metal or metals selected from, without limitation, copper, tin, silver, gold, nickel, palladium, platinum, and alloys of these. In making a cathode layer, the metal particles may comprise a metal or metals selected from, without limitation, aluminum, indium, thallium, titanium, zirconium, hafnium, nickel, palladium, platinum, silver, gold, and alloys thereof.

The metal particles and the active electrode materials may be deposited from separate atmospheric plasma deposition devices or may be deposited from a same atmospheric plasma deposition device. If deposited from a same atmospheric plasma deposition device, the metal particles and active electrode materials may be introduced into the atmospheric plasma as a pre-made mixture (in which the metal particles are either mixed with or adhered in composite particles with the active anode material) or may be introduced into the atmospheric plasma from separate feed lines.

Figure 2:
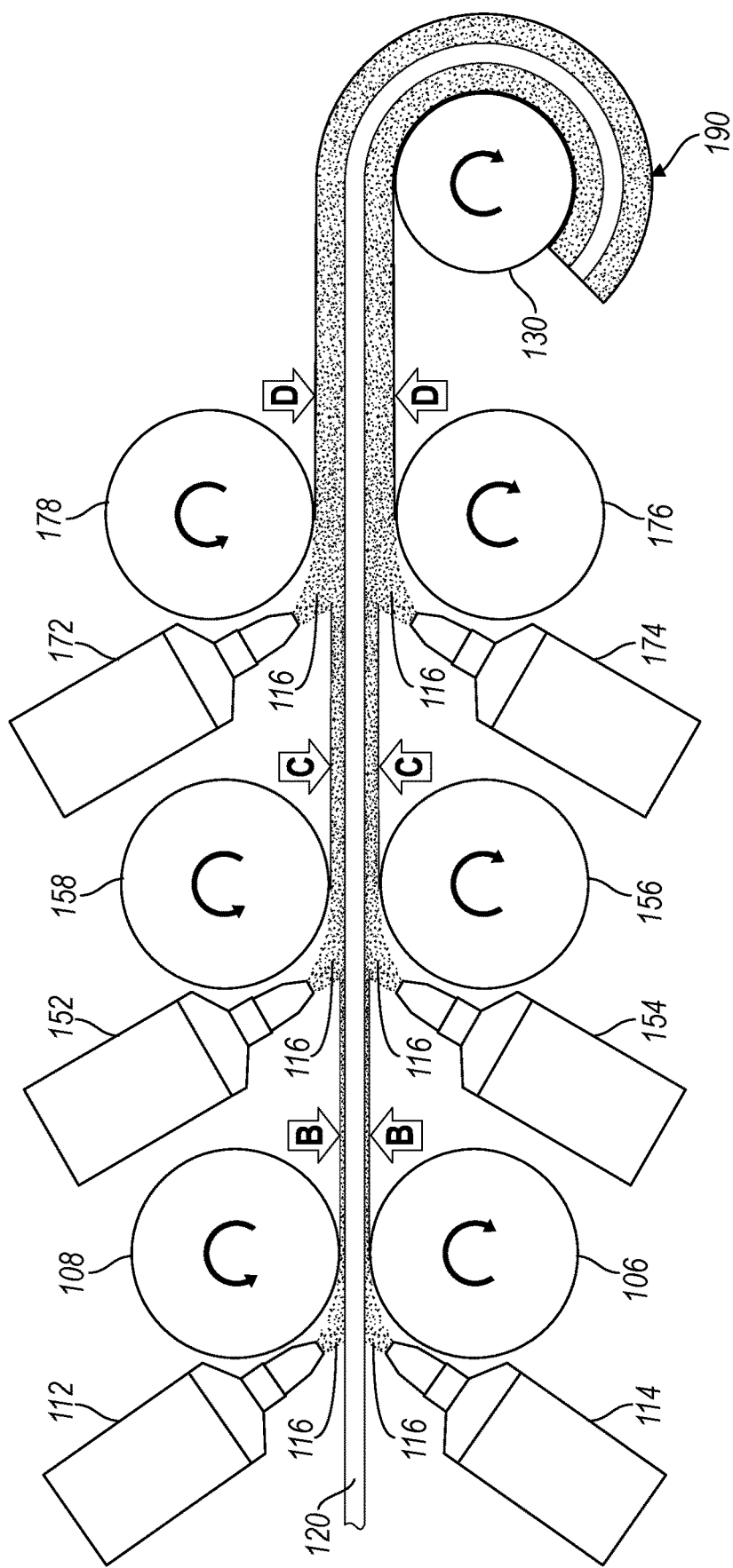
FIG. 2 is a schematic illustration of a second aspect of the invention.

FIG. 2 illustrates coating both sides of a metal foil 120 with cathode or anode material in which a series of plasma deposition devices and calendering roll pairs are used to build up electrode layer thickness through successive atmospheric plasma depositions of electrode material with deposited electrode material being calendered to an increasing thickness with each successive pair of calendering rolls. Plasma deposition devices 112, 114 deposit electrode material 116 on their respective opposite sides of metal foil 120. The metal foil passes through first calendering rolls 106, 108, which press the deposited electrode material into electrode layer thicknesses B-B. Plasma deposition devices 152, 154 deposit additional electrode material on their respective opposite sides of metal foil 120. The metal foil passes through second calendering rolls 156, 158, which press the deposited electrode material into electrode layer thicknesses C-C that is greater than thickness B-B. Plasma deposition devices 172, 174 deposit an additional amount of electrode material on their respective opposite sides of metal foil 120. The metal foil passes through third calendering rolls 176, 178, which press the deposited electrode material into electrode layer thicknesses D-D that is greater than thickness C-C. The gap (also called nip) between second calendering rolls 156, 158 is greater than the gap between first calendering rolls 106, 108, and the gap between third calendering rolls 176, 178 is greater than the gap between second calendering rolls 156, 158 such that the electrode thickness steadily increases as the metal foil 120 advances through each succeeding pair of calendering rolls. It should be apparent that further plasma deposition devices and calendering roll pairs can be used to build up the electrode layer on one or both sides of a substrate as desired, and that the gaps between each face of the metal foil 120 or other substrate and the calendering rolls may be independently selected to independently produce a desired thickness of electrode on each major face of the substrate.

Figure 3:
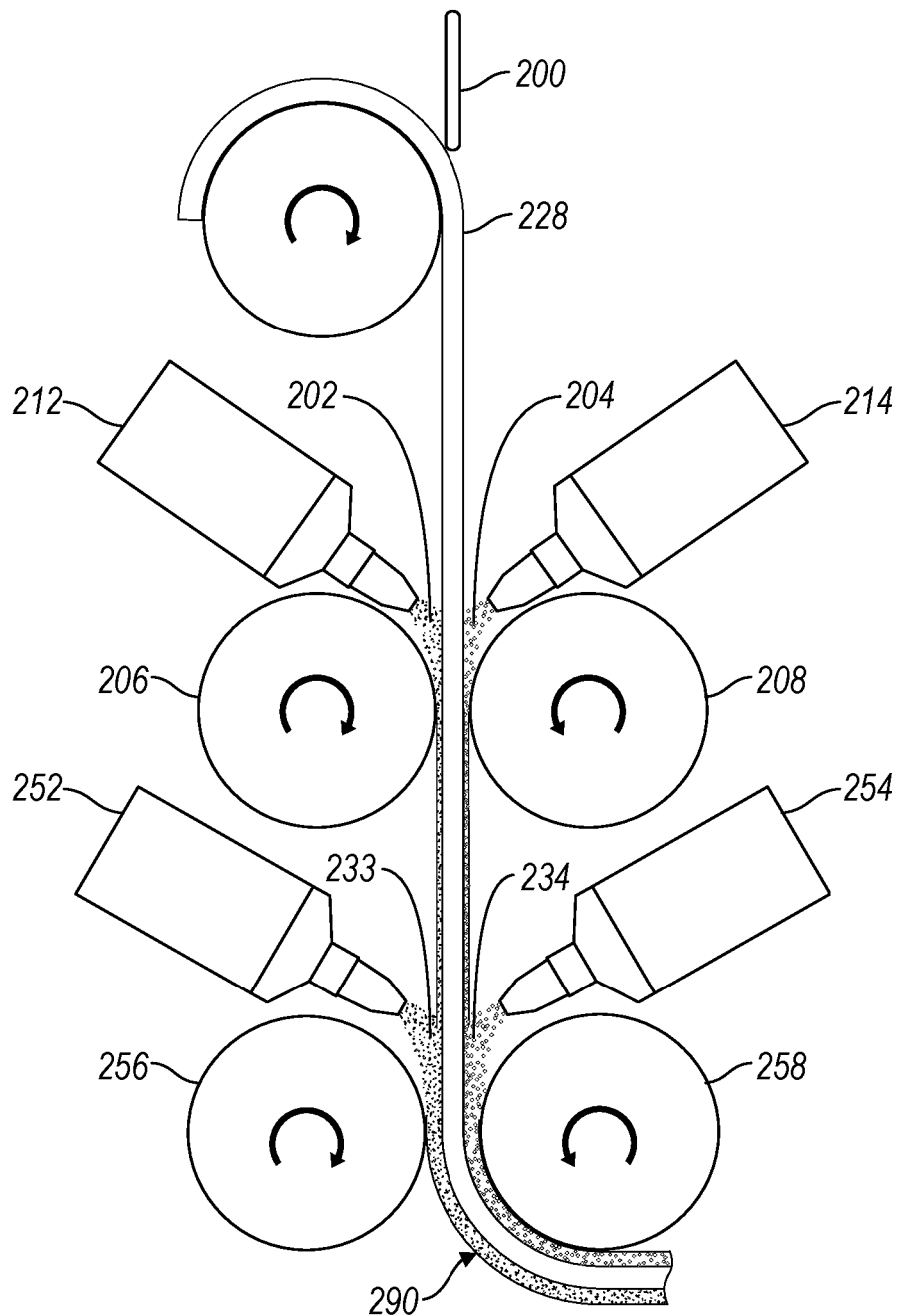
FIG. 3 is a schematic illustration of a third aspect of the invention.

FIG. 3 illustrates an arrangement for making a lithium ion cell component of a porous separator sheet having a cathode layer on a first side and an anode layer on a second side and optionally further including a cathode current collector deposited on the outward side of the cathode layer and an anode current collector deposited on the outward side of the anode layer. A roll of porous separator sheet 228 is unwound and drawn past a separating structure 200, which may be made of a material such as polymer or metal, configured to keep anode and cathode materials separate during the atmospheric plasma depositions of those materials to prevent cross-contamination. Although shown as a simple flat barrier, separating structure 200 may comprise compartments or housings that wrap at least partially around at the ends of at least one of calendering rolls 206, 208 to prevent any passage of the electrode material from that side to the other side of porous separator sheet 228. A first atmospheric plasma deposition device 212 deposits cathode material onto one side of the porous separator sheet 228 in a gap between it and calendering roll 206; a second atmospheric plasma deposition device 214 deposits anode material onto a second side of the porous separator sheet 228 in a gap between it and calendering roll 208. The porous separator sheet 228 then passes through opposing calendering rolls 206, 208, which compress the electrode layers to a desired thickness. The lithium ion cell assembly may then be cut into final shape (not shown) or may be wound on an uptake roll (not shown) for later fabrication and incorporation into lithium ion batteries.

As shown in FIG. 3, metal particles 233 of an appropriate metal for a cathode current collector may be applied from an atmospheric plasma deposition device 252 onto the formed cathode layer, and metal particles 235 of an appropriate metal for an anode current collector may be applied from an atmospheric plasma deposition device 254 onto the formed anode layer. The porous separator sheet 228 then passes through opposing calendering rolls 256, 258, which compress the current collector layers to a desired thickness. The product lithium ion cell component 290 may then be cut into final shape (not shown) or may be wound on uptake roll (not shown) for later forming and incorporation into lithium ion batteries.

Figure 4:
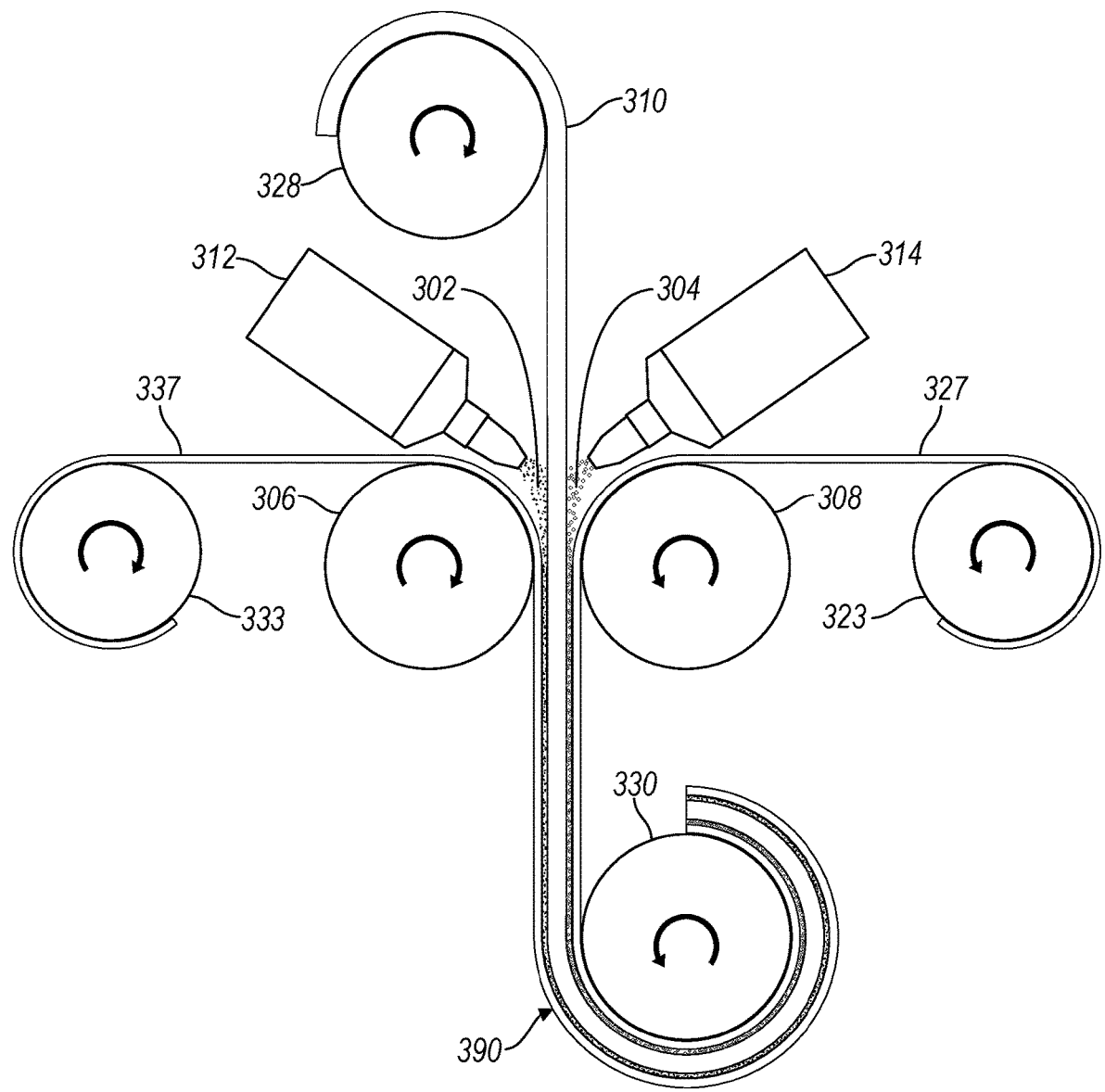
FIG. 4 is a schematic illustration of a fourth aspect of the invention.

FIG. 4 shows a further embodiment for making a lithium ion cell component of a porous separator sheet having a cathode layer on a first side sandwiched between the porous separator sheet and a cathode current collector layer and an anode layer on a second side sandwiched between the porous separator sheet and an anode current collector. A porous separator sheet 310 is unwound from roll 328 and drawn past a separating structure (not shown) configured to keep anode and cathode materials separate during the atmospheric plasma depositions of those materials to prevent cross-contamination. The porous separator sheet 310 passes between calendering rolls 306, 308, not touching either calendering roll. A cathode current collector foil 337 is unwound from roll 333 and drawn around calendering roll 306, with one side of cathode current collector foil 337 against calendering roll 306. A first atmospheric plasma deposition device 312 deposits cathode material 302 into the gap between the porous separator sheet 310 and cathode current collector foil 337. An anode current collector foil 327 is unwound from roll 323 and drawn around calendering roll 308, with one side of anode current collector foil 327 against calendering roll 308. A second atmospheric plasma deposition device 314 deposits anode material 304 into the gap between the porous separator sheet 310 and anode current collector foil 327. The porous separator sheet 310 then continues through opposing calendering rolls 306, 308, which compress the electrode layers to a desired thickness between the porous separator sheet 310 and the respective current collector foils 327, 337. The lithium ion cell assembly 390 may then be cut into final shape (not shown) or may be wound on uptake roll 330 for later forming and incorporation into lithium ion batteries.

Figure 5A:
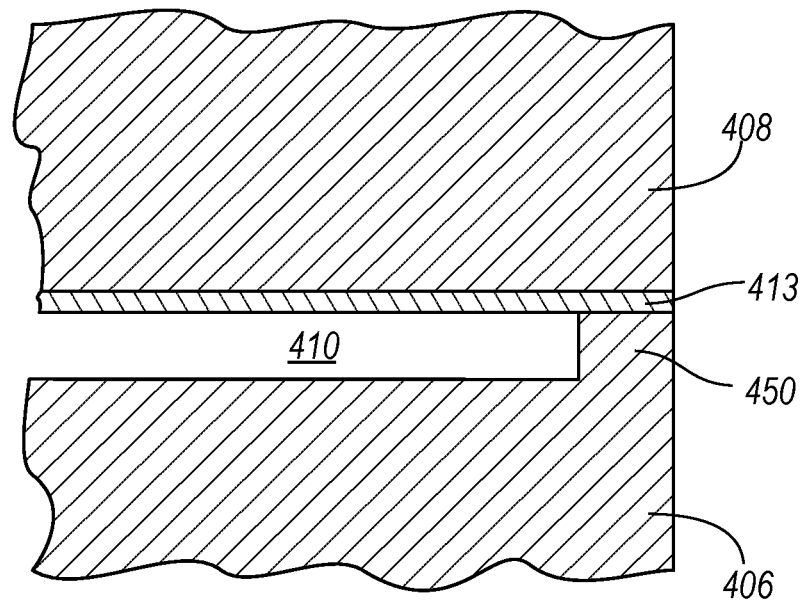
FIG. 5A is a cross-sectional detail showing schematically one arrangement for an integral raised ring at an end of one roll of a pair of the calendering rolls.
Figure 5B:
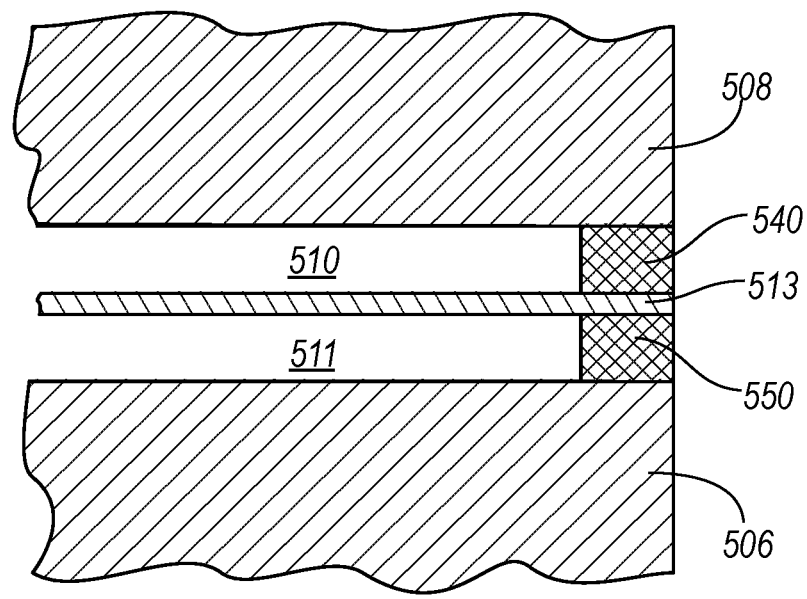
FIG. 5B is a cross-sectional detail showing schematically an arrangement for a gasket over the end of each roll of a pair of calendering rolls to contain electrode material while allowing center passage of a substrate.

In some embodiments, one or more calendering rolls may include an integral or non-integral guard or closure at or near the one or both roll ends. The guard or closure may prevent spillage of the particles of electrode material out of the sides of the gap and/or may provide a sharp edge to the electrode layer formed on the substrate. When the substrate is a foil, a guard or closure may keep one end of the foil uncoated by the electrode material for electrical connection when assembled in a battery. When the substrate is a porous separator, guards or closures may keep both ends of the separator uncoated by the electrode material or provide a sharp edge for the electrode layer at both ends of the separator. FIG. 5A shows such an arrangement, in which calendering rolls 406, 408 are separated by a gap 410. Calendering roll 406 has a terminal, integral ring 450. Substrate 413 passes between roll 408 and ring 450. The apparatus may further include a brush or scraper (not shown) located at a non-engaged area of ring 450 to remove any clinging electrode material from ring 450. FIG. 5B shown an alternative arrangement in which calendering roll 506 has a non-integral gasket 550 and calendering roll 508 has a non-integral gasket 540 around their respective ends. Substrate 513 fits between gaskets 540, 550 and defines a gap 510 between one face of substrate 513 and roll 508 and a gap 511 between the opposite face of substrate 513 and roll 506. Gaskets 540, 550 contain electrode material deposited into gaps 510, 511 by atmospheric plasma deposition and thus produce sharp edges for the electrode layers formed in gaps 510, 511. The gaskets 540, 550 can be cleaned as they rotate through non-engaged areas or can be removed for cleaning.

Suitable porous separators have been made of polymers such as polyethylene, polypropylene, polyethylene oxide, polyvinylidene difluoride (PVDF), and ethylene-propylene copolymers, which may be filled with particulate ceramic material such as alumina ($Al_2O_3$), silica ($SiO_7$), magnesium oxide (MgO), or lithium-containing materials such as $Li_2O$—$P_2O_5$—$B_2O_3$, g-$Li_3PO_4$, $Li_2O$—$Li_2SO_4$—$B_2O_3$, $Li_4GeO_4$/$Li_3VO_4$, $Li_3PO_4$—$Li_2S$—$SiS_2$, $Li_2S$—$SiS_2$—$Li_4SiO_4$, $SiS_2$—$P_2S_5$—$Li_2S$—LiI, LIPON (lithium phosphorous oxynitride): $xLi_2O{:}yP_2O_5{:}zPON$, where x ranges from about 2.8 to 3.8, y ranges from about 3.2 to 3.9, and z ranges from about 0.2 to 0.9, $Li_xLa_{2/3-x3}\ _{1/3-2x3}TiO_3$, $Li_{7-x}La_3Zr_2O_{12-0.5x}$(LLZO), NASICON type glass-ceramic such as $Li_{1+x}M_xTi_{2-x}(PO_4)_3$ (M=Al, In), or LISICON type glass-ceramic: $Li_{2+2x}Zn_{1-x}GeO_4$.

A battery is assembled for an application by combining a suitable number of individual cells in a combination of electrical parallel and series connections to satisfy voltage and current requirements for a specified electric motor. In a lithium-ion battery application for an electrically powered vehicle, the assembled battery may, for example, comprise up to three hundred individually packaged cells that are electrically interconnected to provide forty to four hundred volts and sufficient electrical power to an electrical traction motor to drive a vehicle. The direct current produced by the battery may be converted into an alternating current for more efficient motor operation. The separator is infiltrated with a suitable electrolyte for the lithium ion cell. The electrolyte for the lithium-ion cell is often a lithium salt dissolved in one or more organic liquid solvents. Examples of salts include lithium hexafluorophosphate ($LiPF_6$), lithium tetrafluoroborate ($LiBF_4$), lithium perchlorate ($LiClO_4$), lithium hexafluoroarsenate ($Li\ AsF_6$), and lithium trifluoroethanesulfonimide. Some examples of solvents that may be used to dissolve the electrolyte salt include ethylene carbonate, dimethyl carbonate, methylethyl carbonate, propylene carbonate. There are other lithium salts that may be used and other solvents. But a combination of lithium salt and liquid solvent is selected for providing suitable mobility and transport of lithium ions in the operation of the cell. The electrolyte is carefully dispersed into and between closely spaced layers of the electrode elements and separator layers.

The foregoing description of the embodiments has been provided for purposes of illustration and description. It is not intended to be exhaustive or to limit the invention. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the invention, and all such modifications are intended to be included within the scope of the invention.

What is claimed is:

1. An apparatus, comprising:
a first pair of opposing calendering rolls;
a path defined between the first pair of opposing calendering rolls for advancing a lithium ion cell substrate between the first pair of opposing calendering rolls;
at least one atmospheric plasma generator connected to a supply of particles of a first electrode material, wherein the at least one atmospheric plasma generator is positioned to deposit the particles of the first electrode material into a gap defined between a first side of the lithium-ion cell substrate and a first one of the first pair of opposing calendering rolls, and wherein the particles of the first electrode material comprise a first active electrode material and a first metal;
wherein the first pair of opposing calendering rolls are operable to press the deposited particles of the first electrode material into an electrode layer on the first side of the lithium-on cell substrate,
a second pair of opposing calendering rolls, wherein the path is further defined between the second pair of opposing calendering rolls;
at least one atmospheric plasma generator connected to a supply of particles of a second metal, wherein the at least one atmospheric plasma generator is positioned to deposit the particles of the second metal into a gap defined between the electrode layer and a first one of the second pair of opposing calendering rolls, and
wherein the second metal is suitable for a current collector layer; and wherein the second pair of opposing calendering rolls are operable to press the deposited particles of the second metal into a current collector layer on the electrode layer.

2. The apparatus according to claim 1, further comprising at least one second side atmospheric plasma generator connected to a supply of particles of a second electrode material, wherein the at least one second side atmospheric plasma generator is positioned to deposit the particles of the second electrode material into a second gap defined between a second side of the lithium-ion cell substrate and a second one of the first pair of opposing calendering rolls, wherein the particles of the second electrode material comprise a second active electrode material and a second third metal, wherein the second active electrode material is the same as or different from the first active electrode material, wherein the second third metal is the same as or different from the first metal, and wherein the first pair of opposing calendering rolls are operable to press deposited particles of the second electrode material into a second electrode layer on the second side of the lithium-ion cell substrate.

3. An apparatus, comprising:
a first pair of opposing calendering rolls:
a path defined between the first pair of opposing calendering rolls for advancing a lithium-ion cell substrate between the first pair of opposing calendering rolls;
at least one atmospheric plasma generator connected to a supply of particles of a first electrode material, wherein the at least one atmospheric plasma generator is positioned to deposit the particles of the first electrode material into a gap defined between a first side of the lithium-ion cell substrate and a first one of the first pair of opposing calendering rolls, and wherein the particles of the first electrode material comprise a first active electrode material and a first metal:
wherein the first pair of opposing calendering rolls are operable to press deposited particles of the first electrode material into a first electrode layer on the first side of the lithium-ion cell substrate;
a further pair of opposing calendering rolls, wherein the path is further defined between the further pair of opposing calendering rolls;
at least one atmospheric plasma generator connected to a supply of particles of a second electrode material, wherein the at least one atmospheric plasma generator is positioned to deposit the particles of the second electrode material into a gap defined between the first side of the lithium-ion cell substrate and a first one of the further pair of opposing calendering rolls, wherein the particles of the second electrode material comprise a second active electrode material and a second metal; and
wherein the further pair of opposing calendering rolls are operable to press deposited particles of the second electrode material into an electrode layer on the first side of the lithium ion cell substrate that is thicker than the first electrode layer produced by the first pair of opposing calendering rolls preceding thereof.

4. The apparatus according to claim 3, further comprising at least one second side atmospheric plasma generator connected to a supply of particles of a third electrode material, wherein the at least one second side atmospheric plasma generator is positioned to deposit the particles of the third electrode material into a second gap between a second side of the lithium ion cell substrate and a second one of the further pair of opposing calendering rolls, wherein the particles of the third electrode material comprise a third active electrode material and a third metal, wherein the third active electrode material is the same as or different from the first active electrode material, wherein the third metal is the same as or different from the first metal, and wherein the further pair of opposing calendering rolls are operable to press deposited particles of the third electrode material into a second electrode layer on the second side of the lithium-ion cell substrate.

5. The apparatus according to claim 3, further comprising a final pair of opposing calendering rolls, wherein the path is further defined between the final pair of opposing calendering rolls; and
at least one atmospheric plasma generator connected to a supply of particles of a third metal, wherein the at least one atmospheric plasma generator is positioned to deposit the particles of the third metal into a gap between the first electrode layer and a first one of the final pair of opposing calendering rolls, and wherein the third metal is suitable for a current collector layer; wherein the final pair of opposing calendering rolls are operable to press the deposited particles of the third metal into a current collector layer on the first electrode layer.

6. The apparatus according claim 4, further comprising
a final pair of opposing calendering rolls, wherein the path is further defined between the final pair of opposing calendering rolls;
at least one atmospheric plasma generator connected to a supply of particles of a fourth metal, wherein the at least one atmospheric plasma generator is positioned to deposit the particles of the fourth metal into a gap between the first electrode layer and a first one of the final pair of opposing calendering rolls, and wherein the fourth metal is suitable for a current collector layer; and
at least one atmospheric plasma generator connected to a supply of particles of a fifth metal, wherein the at least one atmospheric plasma generator is positioned to deposit the particles of the fifth metal into a second gap between the second electrode layer and a second one of the final pair of opposing calendering rolls, and wherein the fifth metal is suitable for a current collector layer; wherein the final pair of opposing calendering rolls are operable to press the deposited particles of the fourth metal into a first current collector layer on the first electrode layer and deposited particles of the fifth metal into a second current collector layer on the second electrode layer.

7. An apparatus, comprising:
a first pair of opposing calendering rolls;
a path defined between the first pair of opposing calendering rolls for advancing a lithium ion cell substrate between the pair of opposing calendering rolls;
at least one atmospheric plasma generator connected to a supply of particles of a first electrode material, wherein the at least one atmospheric plasma generator is positioned to deposit the particles of the first electrode material into a gap defined between a first side of the lithium-ion cell substrate and a first one of the first pair of opposing calendering rolls, and wherein the particles of the first electrode material comprise a first active electrode material and a first metal;
wherein the first pair of opposing calendering rolls are operable to press deposited particles of the first electrode material into a first electrode layer on the first side of the lithium-ion cell substrate;
a plurality of further pairs of opposing calendering rolls, wherein the path is further defined between the plurality of further pairs of opposing calendering rolls;
at least one atmospheric plasma generator connected to a supply of particles of a second electrode material, wherein the at least one atmospheric plasma generator is positioned to deposit the particles of the second electrode material into a gap defined between the first side of the lithium-ion cell substrate and a first one of each of the plurality of further pairs of opposing calendering rolls, wherein the particles of the second electrode material comprise as a second active electrode material and a second metal; and
wherein the plurality of further pairs of opposing calendering rolls are operable to press deposited particles of the second electrode material into an electrode layer on the first side of the lithium ion cell substrate that is thicker than the first electrode layer produced by the first pair of opposing calendaring rolls preceding thereof.

8. The apparatus according to claim 7, further comprising
at least one second side atmospheric generator connected to a supply of particles of a third electrode material, wherein the at least one second side atmospheric plasma generator is positioned to deposit the particles of the third electrode material into a second gap between a second side of the lithium ion cell substrate and a second one of each of the plurality of further pairs of opposing calendering rolls, wherein the particles of the second electrode material comprise a third active electrode material and a third metal, wherein the third active electrode material is the same as or different from the first active electrode material, wherein the third metal is the same as or different from the first metal, and wherein each of the plurality of further pairs of opposing calendering rolls are operable to press deposited particles of the third electrode material into a second electrode layer on the second side of the lithium ion cell substrate.

* * * * *